(12) United States Patent
Beverly et al.

(10) Patent No.: US 7,908,364 B2
(45) Date of Patent: Mar. 15, 2011

(54) METHOD STORING SOCKET STATE INFORMATION IN APPLICATION SPACE FOR IMPROVING COMMUNICATION EFFICIENCY OF AN APPLICATION PROGRAM

(75) Inventors: Harlan T. Beverly, McDade, TX (US); Charles A. Musta, Austin, TX (US)

(73) Assignee: Bigfoot Networks, Inc., Austin, TX (US)

( * ) Notice: Subject to any disclaimer, the term of this patent is extended or adjusted under 35 U.S.C. 154(b) by 534 days.

(21) Appl. No.: 12/018,855

(22) Filed: Jan. 24, 2008

(65) Prior Publication Data
US 2008/0183861 A1 Jul. 31, 2008

Related U.S. Application Data

(60) Provisional application No. 60/886,677, filed on Jan. 26, 2007.

(51) Int. Cl.
*G06F 15/173* (2006.01)

(52) U.S. Cl. .......... 709/224; 719/321; 719/322; 719/327

(58) Field of Classification Search .................. 709/224, 709/104, 227, 223, 225, 226; 719/321, 322, 719/327, 323, 324, 325, 326; 370/401, 463; 710/1; 726/13; 718/100
See application file for complete search history.

(56) References Cited

U.S. PATENT DOCUMENTS

| | | | |
|---|---|---|---|
| 5,353,412 A | 10/1994 | Douglas et al. |
| 5,355,371 A | 10/1994 | Auerbach et al. |
| 5,675,736 A | 10/1997 | Brady et al. |
| 5,771,287 A | 6/1998 | Gilley et al. |
| 5,890,963 A | 4/1999 | Yen |
| 6,015,348 A | 1/2000 | Lambright et al. |
| 6,240,517 B1 | 5/2001 | Nishioka |
| 6,615,218 B2 | 9/2003 | Mandal et al. |
| 6,625,661 B1 | 9/2003 | Baldwin, Jr. et al. |
| 6,745,236 B1 | 6/2004 | Hawkins et al. |
| 6,763,371 B1 | 7/2004 | Jandel |
| 6,810,528 B1 | 10/2004 | Chatani |
| 6,908,389 B1 | 6/2005 | Puskala |
| 6,918,042 B1 | 7/2005 | Debry |
| 6,941,353 B1 | 9/2005 | Lane |
| 6,961,852 B2 | 11/2005 | Craft |
| 6,988,196 B2 | 1/2006 | Cromer et al. |
| 7,000,115 B2 | 2/2006 | Lewis et al. |

(Continued)

FOREIGN PATENT DOCUMENTS

DE 10218795 11/2003

(Continued)

OTHER PUBLICATIONS

PCT International Search Report, dated Jul. 22, 2008, 3 pages.

*Primary Examiner* — Le Luu

(57) ABSTRACT

The state of the communication socket is maintained at a network device and communicated to a device driver for the network device. The device driver can send messages to an interface program in application space, which stores the state information in dedicated application space memory. In response to a query from a peer program requesting the state of the communication socket, the interface program retrieves the state information from the dedicated memory. Because the state information and the interface program are located in application space, the number of kernel transitions required to determine the socket state is reduced, improving communication efficiency.

20 Claims, 4 Drawing Sheets

U.S. PATENT DOCUMENTS

| | | |
|---|---|---|
| 7,003,548 B1 | 2/2006 | Barck et al. |
| 7,046,680 B1 | 5/2006 | McDysan et al. |
| 7,065,756 B2 | 6/2006 | Barsness et al. |
| 7,139,780 B2 | 11/2006 | Lee et al. |
| 7,209,449 B2 | 4/2007 | Tang et al. |
| 7,249,109 B1 | 7/2007 | Silverbrook et al. |
| 7,274,702 B2 | 9/2007 | Toutant et al. |
| 2002/0078223 A1 | 6/2002 | Baldonado et al. |
| 2002/0180583 A1 | 12/2002 | Paatero et al. |
| 2002/0198932 A1 | 12/2002 | Wagner |
| 2003/0014468 A1* | 1/2003 | Sudhakaran et al. ......... 709/104 |
| 2003/0177187 A1 | 9/2003 | Levine et al. |
| 2003/0191857 A1 | 10/2003 | Terrell et al. |
| 2004/0062267 A1* | 4/2004 | Minami et al. ................ 370/463 |
| 2004/0068580 A1 | 4/2004 | Jo et al. |
| 2004/0103221 A1* | 5/2004 | Rosu et al. ........................ 710/1 |
| 2004/0230801 A1 | 11/2004 | Sueyoshi et al. |
| 2004/0246905 A1 | 12/2004 | Dunagan et al. |
| 2005/0107161 A1 | 5/2005 | Fujimoto et al. |
| 2005/0182966 A1 | 8/2005 | Pham et al. |
| 2005/0188073 A1 | 8/2005 | Nakamichi et al. |
| 2005/0240993 A1* | 10/2005 | Treadwell et al. ............... 726/13 |
| 2005/0276281 A1 | 12/2005 | Jones |
| 2006/0075119 A1* | 4/2006 | Hussain et al. ............... 709/227 |
| 2006/0075404 A1* | 4/2006 | Rosu et al. .................... 718/100 |
| 2006/0168281 A1 | 7/2006 | Starr et al. |
| 2006/0259579 A1 | 11/2006 | Beverly |
| 2006/0259632 A1 | 11/2006 | Crawford et al. |
| 2007/0005986 A1 | 1/2007 | Bernard et al. |
| 2007/0060373 A1 | 3/2007 | Beverly |
| 2007/0086343 A1 | 4/2007 | Kujawa et al. |
| 2007/0101408 A1 | 5/2007 | Nakhjiri |
| 2007/0189517 A1 | 8/2007 | Koseki et al. |
| 2007/0226498 A1 | 9/2007 | Walmsley et al. |
| 2007/0297405 A1 | 12/2007 | He |
| 2007/0298879 A1 | 12/2007 | Kobayashi et al. |
| 2008/0009337 A1 | 1/2008 | Jackson et al. |
| 2008/0009352 A1 | 1/2008 | Aoyama et al. |
| 2008/0010371 A1 | 1/2008 | Yamamoto et al. |
| 2008/0013551 A1 | 1/2008 | Scholl |
| 2008/0016236 A1 | 1/2008 | Beverly et al. |
| 2008/0022389 A1 | 1/2008 | Calcev et al. |
| 2008/0039208 A1 | 2/2008 | Abrink et al. |
| 2008/0043760 A1* | 2/2008 | Venkatraman et al. ....... 370/401 |
| 2008/0045285 A1 | 2/2008 | Fujito |
| 2008/0049621 A1 | 2/2008 | McGuire et al. |

FOREIGN PATENT DOCUMENTS

| | | |
|---|---|---|
| JP | 10314451 | 12/1998 |
| JP | 2001246147 | 9/2001 |

* cited by examiner

US 7,908,364 B2

METHOD STORING SOCKET STATE INFORMATION IN APPLICATION SPACE FOR IMPROVING COMMUNICATION EFFICIENCY OF AN APPLICATION PROGRAM

CROSS REFERENCE TO RELATED APPLICATIONS

This application claims priority to U.S. Provisional Patent Application No. 60/886,677, entitled "HIGH PERFORMANCE KERNEL BYPASS OBJECT STATE NOTIFICATION MECHANISM," filed on Jan. 26, 2007, which is assigned to the current assignee hereof and are incorporated herein by reference in its entirety.

FIELD OF THE INVENTION

The present disclosure relates generally to data communications, and more specifically to a system and method for monitoring a state of a communication socket at a data processing device.

BACKGROUND

In recent years, several applications have been developed that rely on timely and effective interactions between two or more elements of a communication network. For example, in the sphere of online gaming, hundreds or thousands of game clients executing on user machines may be interacting with a central server executing on a networked computer. With such an architecture, a game server program is frequently tasked with providing content to clients, receiving client requests, processing those requests, responding to those requests, and synchronizing those requests with the requests of other clients. One factor that can affect the server programs ability to timely respond to client requests is the speed at which the server program can be notified that it has received data from the client, and the speed with which the data can be provided to the server program. One conventional method is for the server program to periodically poll the network stack of the server operating system to determine if data has been received. However, this method can take an undesirable amount of time, resulting in an undesirable delay in the server program responding to client requests. Furthermore, the speed at which a client program can be notified that it has received data from the server, and the speed with which the data can be provided to the server program can also cause undesirable delay. Similar problems can occur in peer-to-peer networks, resulting in undesirable delays in communications between programs at computer devices in the peer-to-peer network.

In the gaming context, this can result in distracting events such as game freezes, stuttering, warping, etc. As such, a need exists for an improved processing system and method that manages received data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
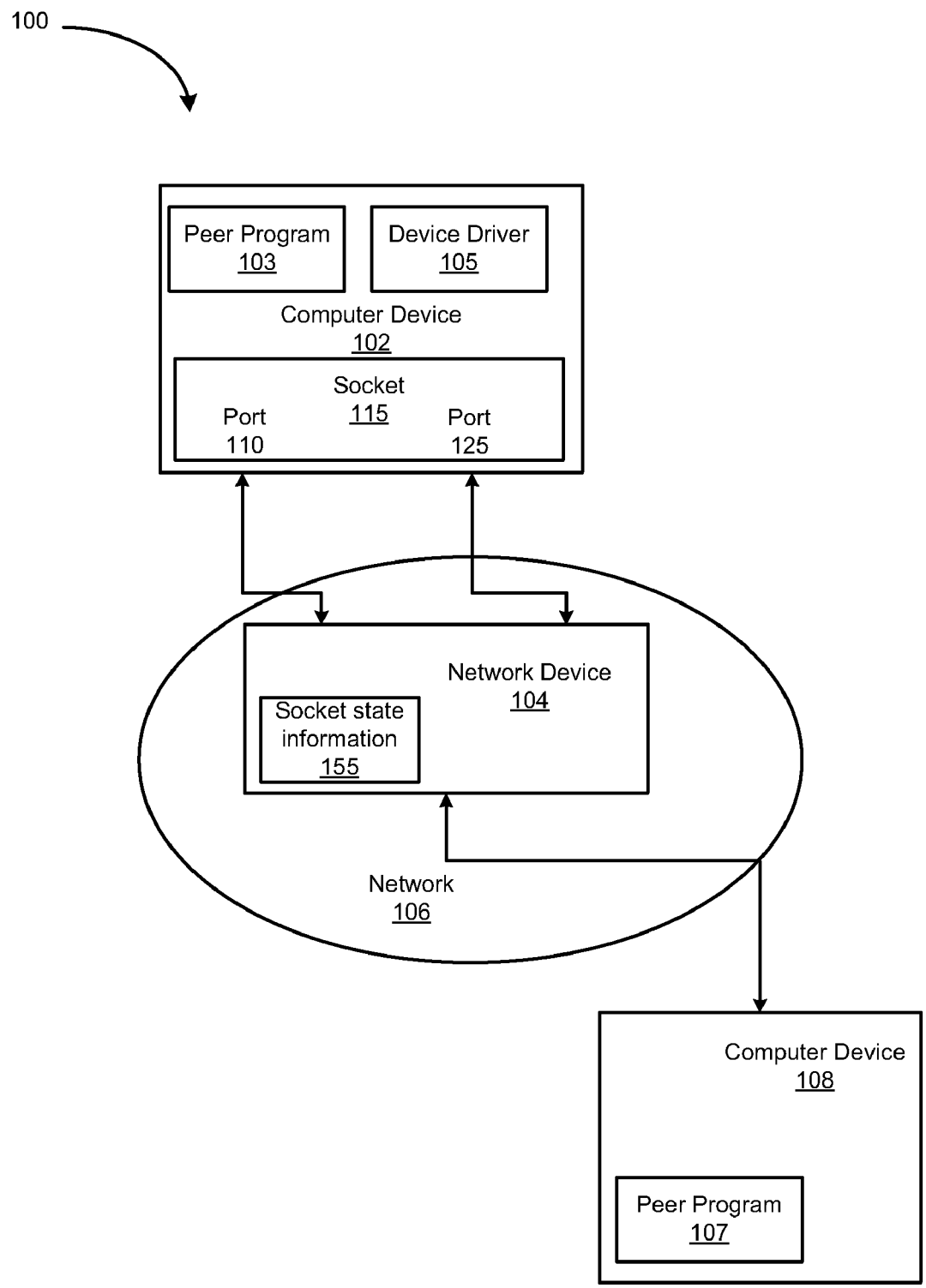
FIG. 1 is a block diagram of a particular embodiment of a network arrangement incorporating teachings of the present disclosure.

Embodiments discussed below describe, in part, distributed computing solutions that manage all or part of a communicative interaction between network elements. In this context, a communicative interaction may be one or more of: intending to send information, sending information, requesting information, receiving information, or receiving a request for information. As such, a communicative interaction could be one directional, bi-directional, or multi-directional. In some circumstances, a communicative interaction could be relatively complex and involve two or more network elements. For example, a communicative interaction may be "a conversation" or series of related communications between a client and a server or computer devices in a peer-to-peer network—each network element sending and receiving information to and from the other. Whatever form the communicative interaction takes, it should be noted that the network elements involved need not take any specific form. A network element may be a node, a piece of hardware, software, firmware, middleware, some other component of a computing system, and/or some combination thereof.

From a high level, a system incorporating teachings of the present disclosure may include a network that monitors communications between a computer programs at different computer devices in a network, such as a client program resident on a user machine and a server program resident on a computer device remote from the user, or a program at one device in a peer-to-peer network communicating with a program at another device in the network. In the case of a server/client architecture, the server program may be part of a two-tier architecture that is deployed in a hub and spoke or centralized server configuration. The server program may also be utilized in a less centralized model. For example, the server program may be implemented as one of two or more client programs that perform server-like functionality. For purposes of discussion herein, a program communicating with another program in the network is referred to herein as a peer program, and the device executing the peer program as a peer.

However, the peer program is implemented, state information indicating the state of a communication socket at the computer device can be monitored and stored in application space. In an embodiment, the state of the communication socket is maintained at a network device and communicated to a device driver for the network device. The device driver can send messages to an interface program in application space, which stores the state information in dedicated application space memory. In response to a query from the peer program requesting the state of the communication socket, the interface program retrieves the state information from the dedicated memory. Because the state information and the interface program are located in application space, the number of kernel transitions required to determine the socket state is reduced, improving communication efficiency.

In another embodiment, the device driver for the network device can store the socket state information in memory that is shared between application space and kernel space. The interface program can then access the stored state information in the shared memory in response to a state query from the peer program.

In still another embodiment, the state information can be maintained at the device driver itself, rather than at the network device. The device driver can communicate the state information to the interface program via messages, or by storing the information in shared memory.

As indicated above, this application claims priority to U.S. Provisional Patent No. 60/886,677 filed on Jan. 26, 2007. The provisional application describes in part specific implementations of the teachings disclosed herein and is not intended to limit the scope of the claims attached below. The entirety of the provisional application is incorporated herein by reference.

Referring to FIG. 1, a block diagram of a particular embodiment of a network arrangement that includes a peer program 103 executing at a computer device 102, a network 106 including a network device 104, and a peer program 107 executing at a computer device 108. The actual location of the network device 104 may be modified in other deployments. For example, the network device may be implemented at the computer device 102 as a network card, a processor dongle, a "LAN on Motherboard" processor, etc. In the embodiment of FIG. 1, network 106 may be a wide area network, such as the Internet, a local area network, or some other appropriate network or bus. Within arrangement 100, computer devices 102 and 108 may be similar or different. For example, computer device 108 may be a local user computer, a laptop, a cellular telephone, a gaming console, a workstation, or some other appropriate device, and host computer device 102 may be a peer computer, a workstation, a peer of computer device 108, or some other appropriate device.

In operation, the peer program 107 and the peer program 103 may communicate with each other via the network 106, and in particular via the network device 104. In one embodiment, the peer program 107 and peer program 103 may work together to provide a user of computer device 108 with an online experience. In operation, peer program 107 may receive content from computer device 102 and may occasionally send requests to peer program 103 in an effort to affect the content being provided or to modify data at the peer program 103. As shown, FIG. 1 includes only two devices executing a peer program. In practice, however, peer program 103 and computer device 102 may be providing content to many peers at or near the same time.

In operation, the peer program 107 may send communications or messages to the peer program 103 to update information, request that tasks be performed, and the like. For example, the peer program 103 can be an online banking application and the peer program 107 can be a web browser. The peer program 107 can send requests to the peer program 103 to view account information, conduct transactions, and the like. In response, the peer program 103 can determine if the requested tasks are authorized and, if so, execute the tasks. In another embodiment, the peer program 103 is a server game program and the peer program 107 is a peer-side game program that provides a user with an online-gaming experience. In another embodiment, the peer program 103 and the peer program 107 work together to provide a game simulation experience to two or more players at each computer device 102 and 106.

To communicate with the peer program 103, the peer program 107 sends messages via the network 106, and in particular to the network device 104. Each message includes information, such as address information, indicating the location of the computer device 102. Each message also includes port information, indicating the target port of the computer device 102 with which the message is associated.

The network device 104 delivers messages from network to the computer device 102 via communication sockets, such a communication socket 115. Each communication socket can be associated with one or more communication ports. In the illustrated embodiment, the communication socket 115 is associated with ports 110 and 125. In an embodiment, each port can be associated with a different program or communication function at the computer device 102.

Each communication socket of the computer device 102 is associated with socket state information indicating the state of the socket. For example, the state information can indicate whether a socket is "busy" (i.e. whether information is currently being transmitted or received at the socket) or "available" (i.e. whether the socket is available to transmit or receive information). To determine the state of a particular socket, programs at the computer device 102 can request the state information associated with that socket. This allows a program to manage communication flows. To illustrate, the peer program 103 can communicate with the peer program 107 via the socket 115. Prior to sending a message, the peer program 103 can request the socket state of the socket 115 from the computer device 102. If the socket state is busy, the peer program 103 can wait to send the message. If the socket state indicates the socket is available the peer program 103 can send the message.

In the illustrated embodiment of FIG. 1, the network device 104 maintains socket state information 155 for the socket 115. In particular, because communications associated with the socket 115 flow through the network device 104, the device is able to determine the state of the socket. For example, based on whether communications are being transmitted or received via the socket 115, the network device updates the state information 155 to indicate whether the socket 115 is busy or available. The state information 155 can also include other state information for the socket 115, such as an error state (e.g. whether communications over the socket have experienced an error, or there is an error associated with the socket itself), socket availability (e.g. whether the socket is available to send or receive data), data availability (e.g. whether data is available to send or be received via the socket), connected state of the socket (e.g. whether the socket is connected or disconnected, including virtually connected or disconnected, to another device for communications), a security state of the socket, including whether communications associated with the socket are encrypted, whether communications associated with the socket are or should be authenticated, and the like), firewall states (e.g. whether the socket is firewall enabled, or enabled for firewall pass through), and the like. The state information 155 can also include information associated with data communicated via the socket 115, including, for example, bandwidth information (e.g. minimum, maximum, or average bandwidth, current bandwidth information), latency information (e.g. minimum, maximum, or average latency), round-trip time for communications, amount of data sent, amount of data received, and the like. In addition, the state information 155 can include information with respect to buffers associated with communications over the socket 115, including buffer overflow and underflow status, amount of data waiting to be sent, amount of data waiting to be received, and the like.

The network device 104 can communicate the state information 155 to the computer device 102 via the device driver 105. In an embodiment, the device driver 105 is a device driver for the network device 104. Accordingly, the device driver 105 can control functions and settings of the network device 104, as well as the interaction between the network device 104 and the computer device 102.

In another embodiment, the socket state information 155 can be maintained at the device driver 105. In this embodiment, the device driver 105 controls communications between programs at the computer device 102, such as the peer program 103, and the network device 104. Accordingly, communications transmitted and received via the socket 115 will be controlled by the device driver 105, allowing the driver to maintain and update the socket state information 155.

In response to receiving the socket state information 155, or in response to an update in the state information (if the state information is maintained at the device driver 105), the device driver 105 communicates the information to application space at the computer device 102. This can be better understood with reference to FIGS. 2 and 3.

Figure 2:
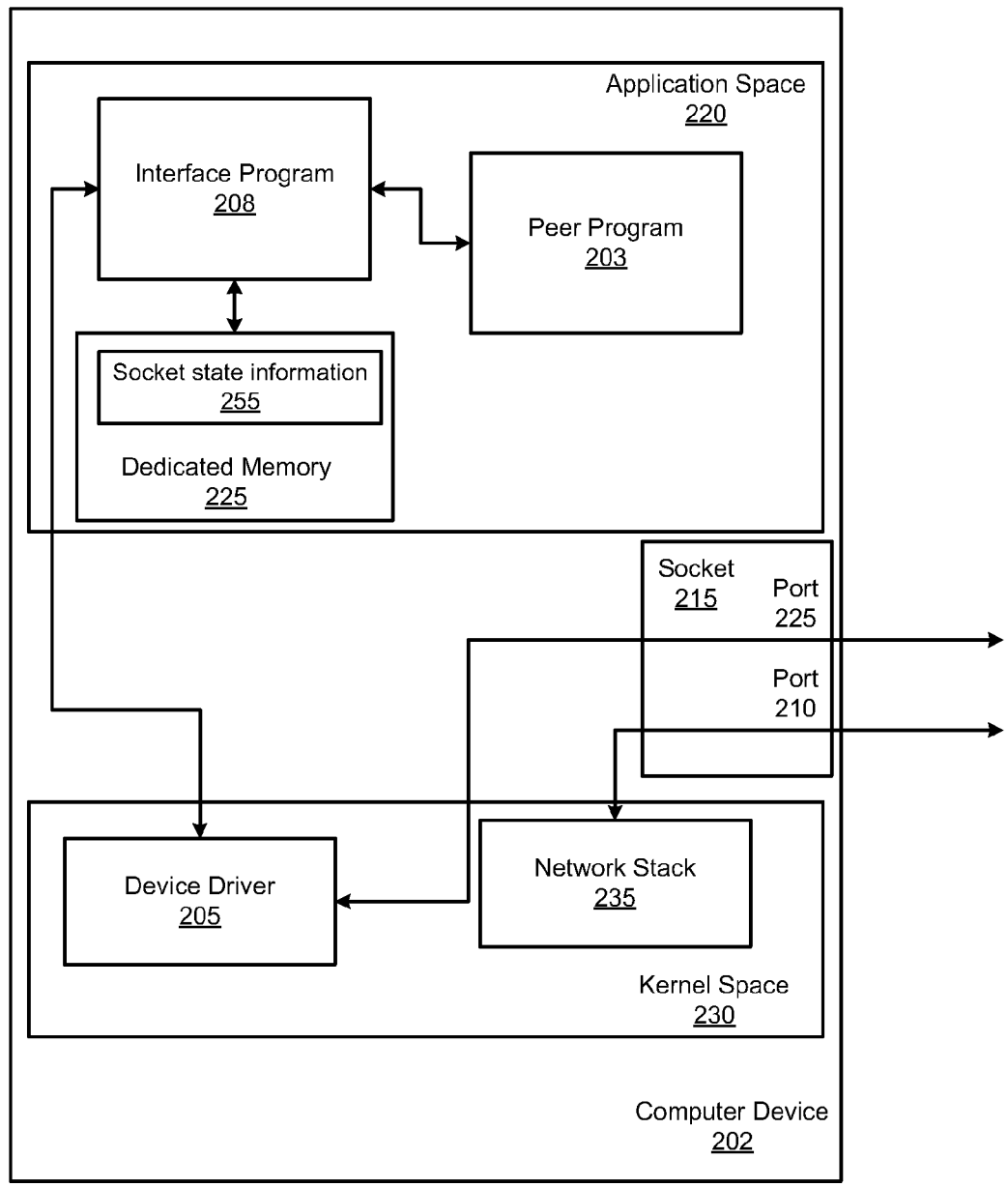
FIG. 2 is a block diagram of a particular embodiment of a computer device that incorporates teachings of the present disclosure.

FIG. 2 illustrates a block diagram of a particular embodiment of a computer device 202, corresponding to the computer device 102 of FIG. 1. The computer device 202 includes application space 220 and kernel space 230. As used herein, the term kernel space refers to memory address space that is typically only accessible by the kernel of an operating system at the computer device 202. Applications executing at the computer device 202 typically cannot access the kernel space directly, but instead must request information stored in the kernel space from the operating system kernel. Application space refers to memory address space that is accessible by applications at the computer device 202. Applications can typically access information stored in the application space 220 more quickly than information stored in the kernel space 230, because accesses to the application space 220 are not typically performed through the kernel. Note that both the kernel space 230 and the application space 220 can be virtual memory address spaces.

As illustrated, the application space 220 includes a peer program 203, an interface program 208, and dedicated memory 225. The dedicated memory 255 is dedicated to the application space 220, and is typically not accessed directly by programs executing in the kernel space 230. The kernel space 230 includes a network stack 235 and a device driver 205, corresponding to the device driver 105 of FIG. 1.

In operation, the network stack 235 is configured to store messages and other information received from the network 106 via the socket 215, corresponding to the socket 115 of FIG. 1. As illustrated, the socket 215 includes ports 210 and 225. In the illustrated embodiment, the port 225 is associated with the peer program 203, while the port 210 is associated with another program (not shown).

The network stack 235 is accessed by the kernel in response to requests from applications executing at the computer device 202. The kernel can determine if the network stack stores data for the requesting application and, if so, provide the data. Because the kernel typically executes a number of tasks in addition to accessing the network stack 235, accessing the network stack typically takes more time than an access to data stored in the application space 220.

The device driver 205 receives socket state information from the network device 104 based on the socket state information 155. In response to receiving the state information, the device driver 105 sends a message to the interface program 208. In an embodiment, the message includes the socket state information. In response to receiving the message, the interface program 208 stores the socket state information 255 in the dedicated memory 225.

To determine the state of the socket 215, the peer program 203 can send a state query to the interface program 208. In response, rather than requesting the state information from the kernel space 230 as in conventional systems, the interface program accesses the stored socket state information 255. This allows the interface program 208 to more quickly access the state information, improving communication efficiency. The interface program 208 provides the socket state information 255 to the peer program 203, which manages communication based on the information. Thus, if the socket state information 255 indicates that the socket 215 is available, the peer program 203 can send a message via the socket. In contrast, if the socket state information 255 indicates the socket is busy, the peer program 203 can perform tasks other than sending a message until the socket is available.

Figure 3:
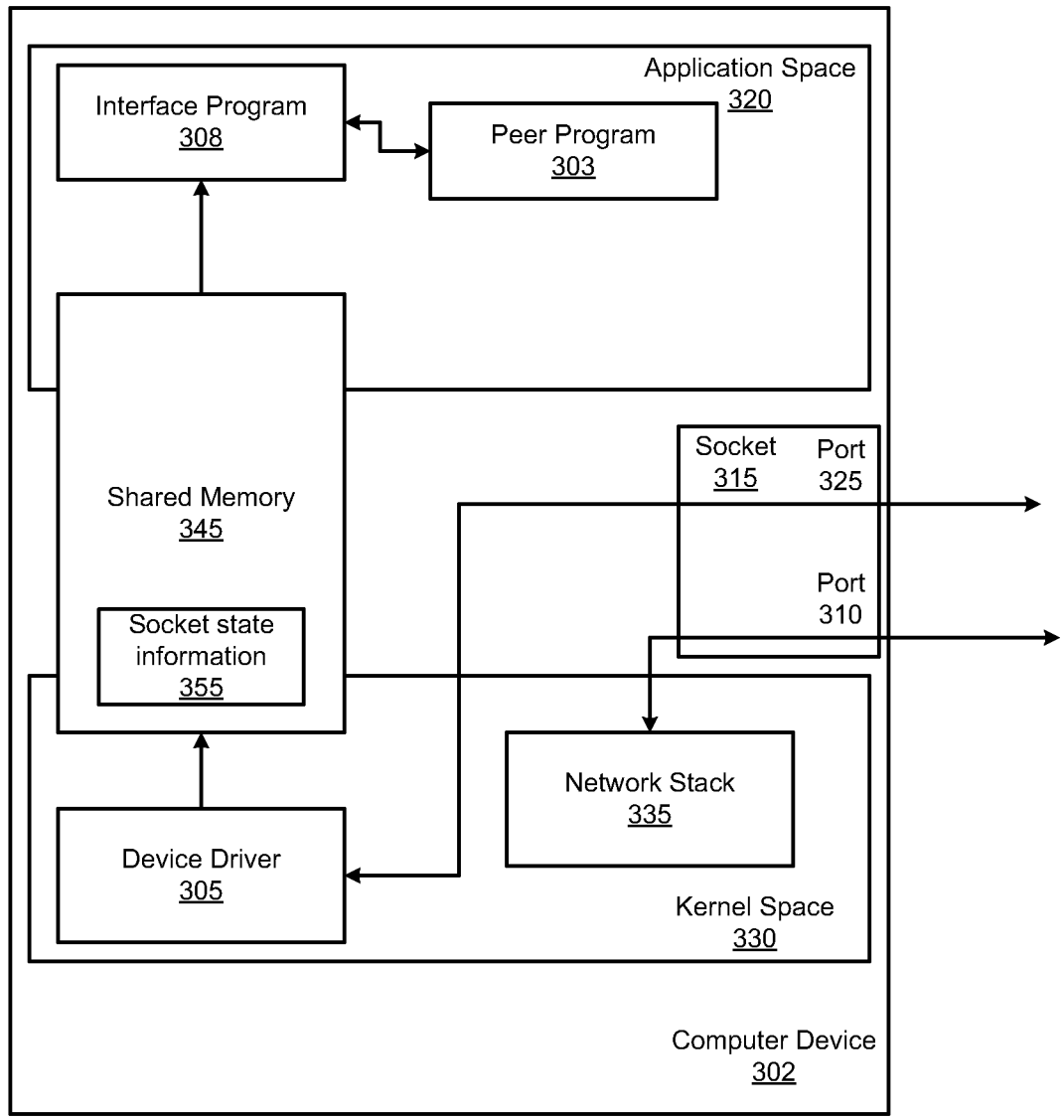
FIG. 3 is a block diagram of an alternative embodiment of a computer device and a network device that incorporates teachings of the present disclosure.

Referring to FIG. 3, a block diagram of a particular embodiment of a computer device 302, corresponding to the computer device 102 of FIG. 1, is illustrated. The computer device 302 includes application space 320, which includes an interface program 308 and a peer program 303. The computer device 302 also includes kernel space 330, which includes a device driver 305 and a network stack 335. Further, the computer device 302 includes a communication socket 315, including communication ports 310 and 325. In addition, the computer device 302 includes shared memory 345. The shared memory 345 is memory space that can be accessed by applications executing in application space 320 and functions executing in kernel space 330. Accordingly, the shared memory 330 can be a portion of virtual memory that is addressable by functions executing in kernel space 330 and applications executing in application space 320.

In operation, the device driver 305 receives information from the network device 104 indicating the state of the socket 215. In response the device driver 305 stores socket state information 355 in the shared memory 330. The socket state information 355 indicates the state of the socket 215, such as whether the socket is available or busy.

To determine the state of the socket 315, the peer program 303 can send a state query to the interface program 308. In response, the interface program 308 accesses the socket state information 355 stored in the shared memory 330. This allows the interface program 308 to access the state information 355 more quickly than accessing the information through the kernel space 330, improving communication efficiency. The interface program 308 provides the socket state information 355 to the peer program 303, which manages communication based on the information. Thus, if the socket state information 355 indicates that the socket 315 is available, the peer program 303 can send a message via the socket. In contrast, if the socket state information 355 indicates the socket is busy, the peer program 303 can perform tasks other than sending a message until the socket is available.

Figure 4:
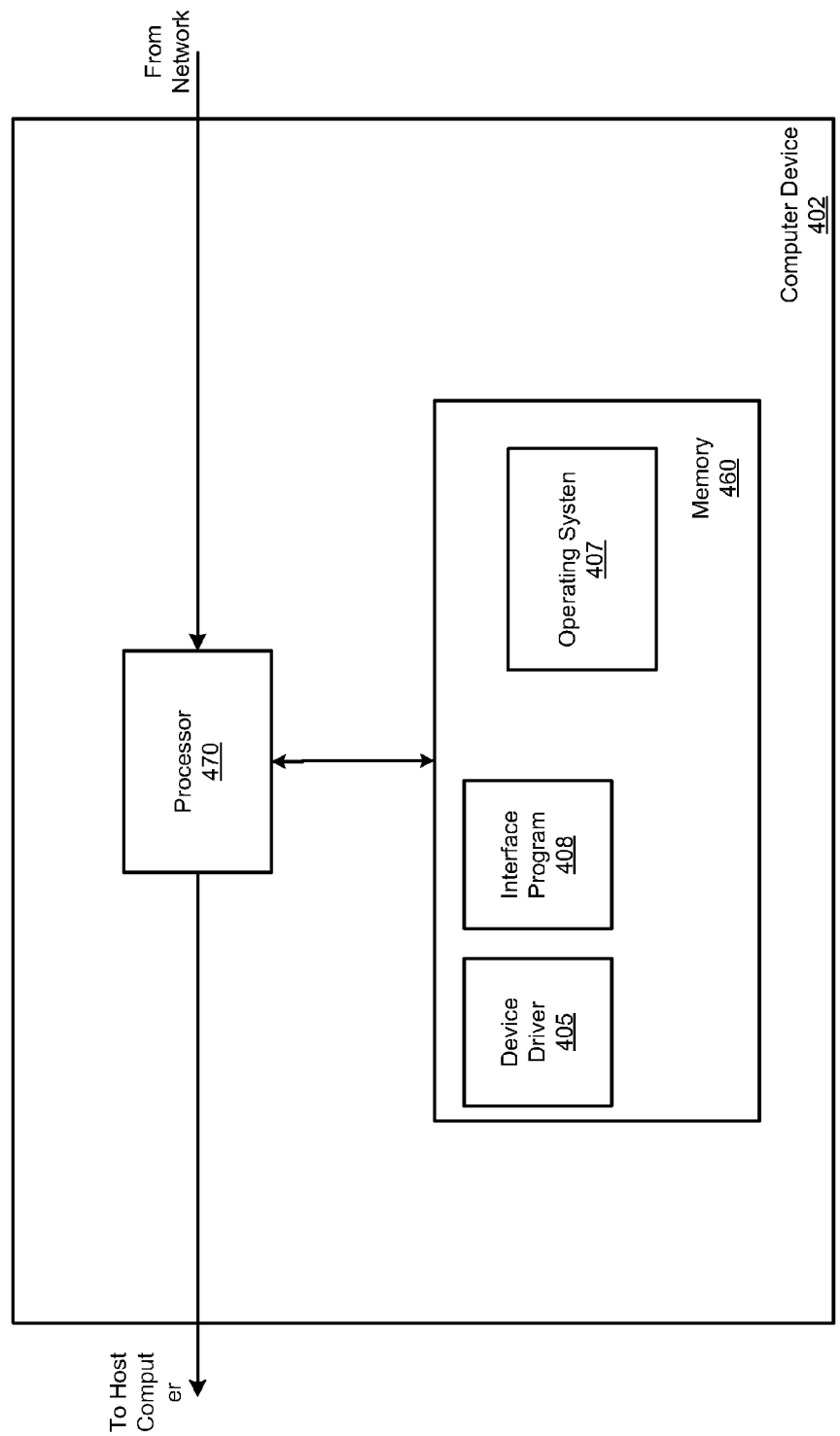
FIG. 4 is a block diagram of an alternative embodiment of a network device and a computer device that incorporates teachings of the present disclosure.

Referring to FIG. 4, a block diagram of a particular embodiment of a computer device 402, corresponding to the network device 102, is illustrated. The computer device 402 includes a processor 470 and a memory 460. The memory 460 is accessible to the processor 470. The processor 470 can be a microprocessor, microcontroller, and the like. The memory 460 is a computer readable medium that can be volatile memory, such as random access memory (RAM), or non-volatile memory, such as a hard disk or flash memory.

The memory 560 stores an interface program 408, a device driver 405, and an operating system 407. The interface program 408, the device driver 405, and the operating system 407 include instructions to manipulate the processor 470 in order to implement one or more of the methods described herein. Other programs, such as applications, can also be stored in the memory 460 to manipulate the processor in order to implement the described methods. It will be appreciated that the network device 104 could be configured similarly to the computer device 402, including a memory to store one or more programs to manipulate a processor to implement one or more of the methods described herein.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for improving communication efficiency of an application program in a data processing device, comprising:
   receiving first information indicative of a state of a communication socket by a device driver at the data processing device from a network device;
   sending the state of the communication socket from the device driver to a program interface;
   storing an indicator of the state of the communication socket in application space located in dedicated memory at the data processing device in response to receiving the first information;
   accessing and determining status of the indicator by the program interface in response to requesting status of the state of the communication socket by the application program; and
   managing communication by the application program based on the status of the state of the communication socket received from the interface program.

2. The method of claim 1, wherein the device driver is located in kernel space.

3. The method of claim 1, wherein the indicator of the state of the communication socket includes information associated with the availability of the communication socket to communicate data.

4. The method of claim 1, wherein the indicator of the state of the communication socket includes information associated with data communicated via the communication socket.

5. The method of claim 1, wherein the indicator of the state of the communication socket includes information associated with an error state of the communication socket.

6. The method of claim 5, wherein the error state indicates an error associated with communications over the communication socket.

7. The method of claim 1, wherein the indicator of the state of the communication socket includes information associated with a security state of the communication socket.

8. The method of claim 1, wherein the indicator of the state of the communication socket includes information associated with a firewall state of the communication socket.

9. The method of claim 1, wherein the indicator of the state of the communication socket includes information associated with a bandwidth associated with the communication socket.

10. The method of claim 1, wherein the indicator of the state of the communication socket includes information associated with a latency associated with the communication socket.

11. A method, comprising:
    maintaining at a device driver of a data processing device first information indicative of a state of a communication socket at the data processing device;
    sending the state of the communication socket from the device driver to a program interface;
    storing an indicator of the state of the communication socket in application space located in dedicated memory at the data processing device in response to a change in the state of the communication socket;
    accessing and determining status of the indicator by the program interface in response to requesting status of the state of the communication socket by the application program; and
    managing communication by the application program based on the status of the state of the communication socket received from the interface program.

12. The method of claim 11, wherein the device driver is located in kernel space.

13. A non-transitory computer readable medium storing a computer program comprising instructions to manipulate a processor, the instructions comprising instructions to:
    receive first information indicative of a state of a communication socket by a device driver at the data processing device from a network device;
    send the state of the communication socket from the device driver to a program interface;
    store an indicator of the state of the communication socket in application space located in dedicated memory at the data processing device in response to receiving the first information;
    access and determining status of the indicator by the program interface in response to requesting status of the state of the communication socket by the application program; and
    manage communication by the application program based on the status of the state of the communication socket received from the interface program.

14. The computer readable medium of claim 13, wherein the device driver is located in kernel space.

15. The computer readable medium of claim 13, wherein the indicator of the state of the communication socket includes information associated with the availability of the communication socket to communicate data.

16. The computer readable medium of claim 13, wherein the indicator of the state of the communication socket includes information associated with data communicated via the communication socket.

17. The computer readable medium of claim 13, wherein the indicator of the state of the communication socket includes information associated with an error state of the communication socket.

18. The computer readable medium of claim 13, wherein the error state indicates an error associated with communications over the communication socket.

19. The computer readable medium of claim 13, wherein the indicator of the state of the communication socket includes information associated with a security state of the communication socket.

20. The computer readable medium of claim 13, wherein the indicator of the state of the communication socket includes information associated with a firewall state of the communication socket.

* * * * *